United States Patent [19]

Okaya et al.

[11] Patent Number: 5,691,928
[45] Date of Patent: Nov. 25, 1997

[54] PORTABLE PERSONAL COMPUTER HAVING REMOVABLE SECURITY MODULE

[75] Inventors: Ken P. Okaya; Bryan F. Howell, both of Austin, Tex.

[73] Assignee: Dell USA, L.P., Round Rock, Tex.

[21] Appl. No.: 417,307

[22] Filed: Apr. 5, 1995

[51] Int. Cl.$^6$ .................................. G06F 3/00; H04L 9/00
[52] U.S. Cl. .......................... 364/709.05; 380/4; 380/50
[58] Field of Search .......................... 364/709.05, 706; 380/2–4, 25, 30, 52, 49, 50, 21, 23; 395/750

[56] References Cited

U.S. PATENT DOCUMENTS

| | | | |
|---|---|---|---|
| 4,139,893 | 2/1979 | Poland | 364/709.05 |
| 4,604,708 | 8/1986 | Lewis | 395/188.01 |
| 5,325,430 | 6/1994 | Smyth et al. | 380/4 |
| 5,355,414 | 10/1994 | Hale et al. | 364/709.05 |
| 5,406,261 | 4/1995 | Glenn | 340/571 |
| 5,457,748 | 10/1995 | Bergum et al. | 380/50 |
| 5,533,125 | 7/1996 | Bensimon et al. | 380/4 |

*Primary Examiner*—Reba I. Elmore
*Assistant Examiner*—Emmanuel L. Moise

*Attorney, Agent, or Firm*—Skjerven, Morrill, MacPherson, Franklin & Friel, L.L.P.; Stephen A. Terrile

[57] ABSTRACT

A portable computer and a method of securing the same. The portable computer comprises: (1) a main chassis containing (a) data processing and volatile storage circuitry of the portable computer, (b) a nonvolatile storage unit coupled to the data processing and volatile storage circuitry and (c) a source of electrical power and (2) a security module removably coupled to the main chassis and containing circuitry for (a) enabling decryption of encrypted data stored in the nonvolatile storage unit and (b) coupling the source of electrical power to the data processing and volatile storage circuitry only when the security module is coupled to the main chassis, the decryption disabled and the source of electrical power decoupled from the data processing and volatile storage circuitry when the security module is removed from the main chassis. The security module impairs the intrinsic value of the portable computer's hardware by removing critical portions thereof, such as the physical connection between the source of electrical power and the data processing and volatile storage circuitry and at least the logical connection between the nonvolatile storage unit and the data processing and volatile storage circuitry.

20 Claims, 2 Drawing Sheets

PORTABLE PERSONAL COMPUTER HAVING REMOVABLE SECURITY MODULE

TECHNICAL FIELD OF THE INVENTION

The present invention is directed, in general, to computer systems and, more specifically, to a removable security module for a personal computer (PC) that contains circuitry vital to the continued function of the PC. The module is removable to allow the PC to be disabled, thereby diminishing its value to a prospective thief and protecting the data stored therein from unauthorized retrieval.

BACKGROUND OF THE INVENTION

Portable, battery-powered computers have become increasingly popular over the last several years due to their light weight and small size that permit them to be easily hand-carried in an ordinary briefcase. Business travelers, in particular, find such portable computers advantageous in cramped spaces, such as on airline seat back trays, and in areas lacking electrical plug-in facilities. In fact, a particularly small type of portable computer, the notebook computer, is very popular, generally having dimensions of 8.5"×11" and a weight of less than 8 pounds. In fact, "subnotebook" computers and personal digital assistants ("PDAs"), having even smaller dimensions, have recently found public acceptance. For purposes of this discussion, "portable" is a generic term including, but not limited to, larger-than-notebook, notebook and subnotebook computers, PDAs and other movable computers.

The modern notebook computer typically employs a clamshell chassis that incorporates both hard and floppy disk drives, a visual display-built into its lid portion, and a keyboard built into its main body portion. It is thus a fully self-contained computer able to be conventionally used, for limited periods of time, in situations and locations in which the use of a much larger desktop computer is simply not feasible.

As is well-known, however, even state-of-the-art portable computers have certain limitations and disadvantages, compared to their much larger desktop computer counterparts. For example, the compact keyboard of a portable computer is often considerably less comfortable to use for extended periods of time compared to the more spacious separate keyboards normally provided with desktop computers. Further, display size and clarity are frequently compromised in comparison to the cathode ray tubes associated with desktop computers.

Another significant disadvantage of portable computers stems from their primary advantage: portability. Unlike their desktop counterparts, portable computers are freed from the confines of a relatively secure office environment and often brought into and temporarily laid down in public places, such as busy airports and restaurants. Thus, their exposure to the risk of theft is substantial. Further, their portability, high cost and ready re-marketability make them attractive targets for thieves.

In addition to the intrinsic value of the computer's hardware as electronic equipment, portable computers often contain far more valuable software, including owner-generated data. In stark contrast to other theft-prone equipment, such as car stereo equipment, portable computers thus also are attractive prey for thieves caring little about the computer's intrinsic hardware value, but intent on gaining access to the computer's sensitive software contents. These data thieves, perhaps in the form of an industrial spy or jealous coworker, would be substantially deterred from divesting the owner of the portable computer if access to the software therein was denied.

Thus, achieving security for a portable computer requires addressing both of these concerns, namely, substantially diminishing the computer hardware's intrinsic value to the common thief and severing access to the software contained therein to deter the more sophisticated criminal.

In the past, providing security for a portable computer was mostly limited to the latter concern: denying access to the software or data. Denial was generally carried out by password protection or encryption schemes. Protection from casual thievery was limited to providing lockable containers for containing the portable computer or leashes for securing the portable computer to a relatively immovable object, such as a desk. Unfortunately, these physical restraints tend substantially to diminish the portability, and thus a large part of the value, of the computer to the owner.

Accordingly, what is needed in the art is a way of securing a portable computer against both theft of the computer hardware and access to the data stored therein without substantially hampering the utility of the computer to the owner.

SUMMARY OF THE INVENTION

To address the above-discussed deficiencies of the prior art, it is a primary object of the present invention to provide a portable computer having a removable security module. The security module, when removed, should substantially diminish both the intrinsic value of the portable computer and access to the software stored therein.

In the attainment of the above primary object, the present invention provides a portable computer and a method of securing the same. The portable computer comprises: (1) a main chassis containing (a) data processing and volatile storage circuitry of the portable computer, (b) a nonvolatile storage unit coupled to the data processing and volatile storage circuitry and (c) a source of electrical power and (2) a security module removably coupled to the main chassis and containing circuitry for (a) enabling decryption of encrypted data stored in the nonvolatile storage unit and (b) coupling the source of electrical power to the data processing and volatile storage circuitry only when the security module is coupled to the main chassis, the decryption module disabled and the source of electrical power decoupled from the data processing and volatile storage circuitry when the security module is removed from the main chassis.

Thus, the present invention introduces the removable security module. The security module impairs the value of the computer's hardware by removing critical portions thereof, such as the physical connection between the source of electrical power and the data processing and volatile storage circuitry and at least the logical connection between the nonvolatile storage unit and the data processing and volatile storage circuitry.

"Data processing and volatile storage circuitry" includes the portable computer's central processing unit ("CPU") and random access memory ("RAM"). Disabling the encryption/decryption circuit, by whatever means, impairs both the value of the portable computer's hardware and access to the portable computer's software, thereby accomplishing the primary object.

In a preferred embodiment of the present invention, the main chassis further contains encryption/decryption circuitry coupled between the data processing and volatile storage circuitry and the nonvolatile storage unit and the security module further contains nonvolatile storage circuitry having an encryption key stored therein, the nonvolatile storage circuitry coupled to the encryption/decryption circuitry only when the security module is coupled to the main chassis to allow the encryption/decryption circuitry to retrieve the encryption key from the nonvolatile storage circuitry. Alternatively, the security module can be made to contain the encryption/decryption circuitry. However, in such an alternative, a high speed bus would be required to traverse an electrical connector between the security module and the main chassis.

In this embodiment, a relatively high speed bus couples the nonvolatile storage unit to the data processing and volatile storage circuitry via the encryption/decryption circuitry. A relatively low speed bus couples the nonvolatile storage circuitry in the security module to the encryption/decryption circuitry. As long as the security module is joined to the main chassis and the low speed bus is therefore intact, the encryption/decryption circuitry has access to the encryption key, thereby enabling decryption of the data stored in the nonvolatile storage unit. Without the encryption key, and depending upon the strength of the encryption algorithm employed, security with respect to the data stored in the unit is significantly enhanced.

In a preferred embodiment of the present invention, the security module further contains a main power switch of the portable computer, the main power switch coupled between the source of electrical power and the data processing and volatile storage circuitry only when the security module is coupled to the main chassis. In this embodiment, the security module actually includes the portable computer's main power switch. In an alternative preferred embodiment of the present invention, the security module further contains a conductor for coupling the source of electrical power to the data processing and volatile storage circuitry only when the security module is coupled to the main chassis. In this alternative embodiment, the main power switch is associated with the main chassis. Removal of the security module from the main chassis interrupts electrical power either entering or exiting the main power switch.

In a preferred embodiment of the present invention, the security module further contains an AC adapter input connector, the AC adapter input connector coupled to the source of electrical power only when the security module is coupled to the main chassis. Thus, the security module preferably further contains the means by which the portable computer is coupled to its associated AC adapter. This prevents a thief from circumventing a lack of a connection to the portable computer's internal source of electrical power by plugging in the AC adapter.

In a preferred embodiment of the present invention, the security module further contains a data input device of the portable computer, the data input device coupled to the data processing and volatile storage circuitry only when the security module is coupled to the main chassis and selected from the group consisting of: (a) a pointing device and (b) a momentary switch. Thus, the security module preferably further contains at least some of the means by which a user may interact with the portable computer. The lack of such data input device (brought about when the security module is removed from the main chassis) significantly impairs operation of the portable computer.

In a preferred embodiment of the present invention, the main chassis further contains visual display circuitry, the visual display circuitry coupled to the data processing and volatile storage circuitry only when the security module is coupled to the main chassis. Removal of the security module from the main chassis may therefore impair operation of the portable computer's display circuitry, including the computer's visual display.

In a preferred embodiment of the present invention, the main chassis further contains a keyboard input device, the keyboard input device coupled to the data processing and volatile storage circuitry only when the security module is coupled to the main chassis. Removal of the security module from the main chassis may therefore also impair operation of the portable computer's keyboard.

It is a further object of the present invention to make the security module highly portable and convenient to carry. Therefore, in a preferred embodiment of the present invention, the security module is less than 10 cubic inches in volume. More preferably, the security module should have dimensions on the order of a common audio cassette, allowing the security module to be stored in the owner's pocket.

In a preferred embodiment of the present invention, the computer is a portable PC selected from the group consisting of: (a) a notebook PC, (b) a subnotebook PC and (c) a PDA. Those of ordinary skill in the art will recognize, however, that desktop computers would benefit from the security module of the present invention. As even desktop computers are somewhat portable, the term "portable computer" can refer to desktop computers. Thus, desktop computers are fully within the broad scope of the present invention.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
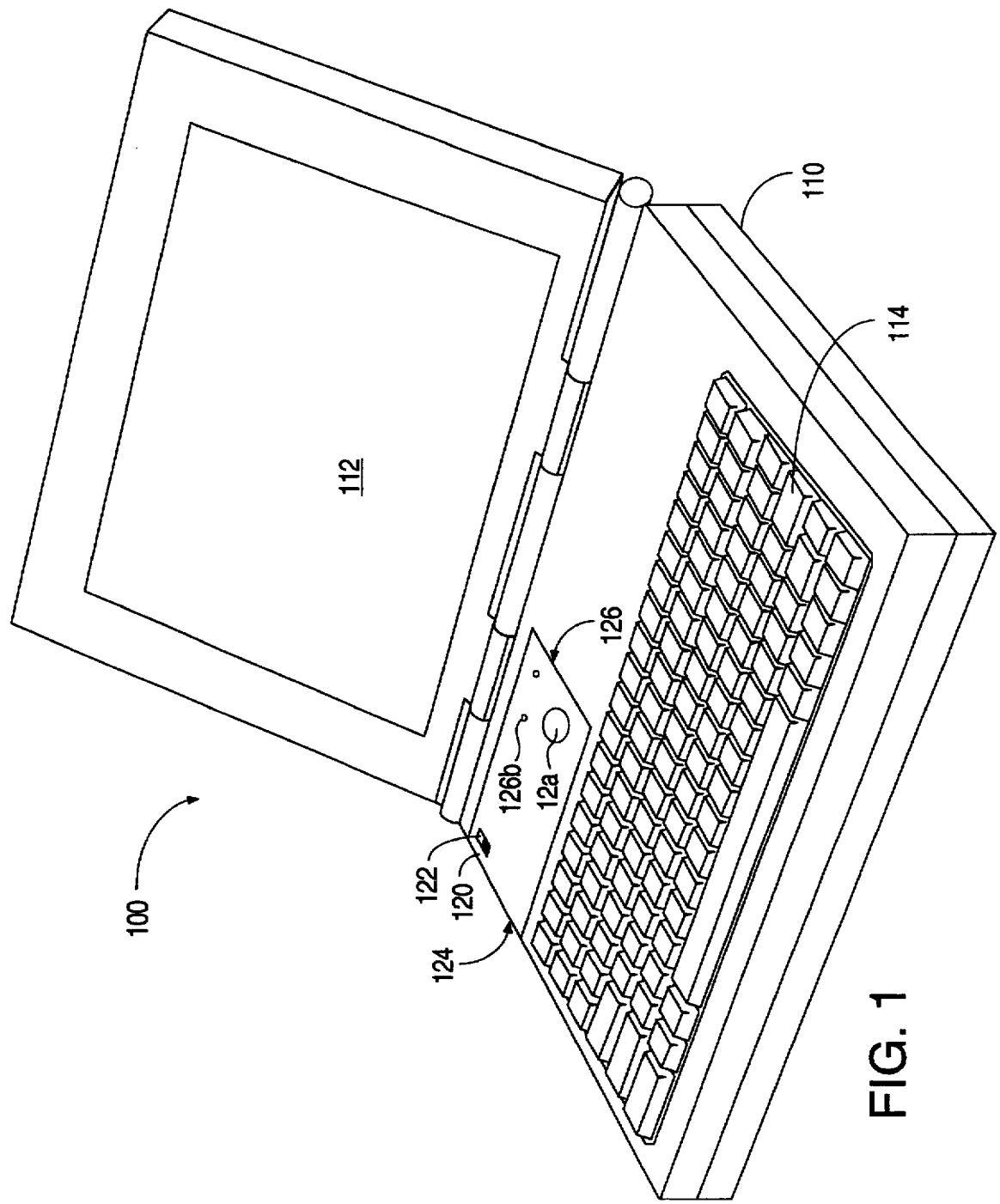
FIG. 1 illustrates an isometric view of a portable computer according to the present invention and thus employing a removable security module.

Referring initially to FIG. 1, illustrated is an isometric view of a portable computer 100 according to the present invention and thus employing a removable security module. The portable computer 100 is illustrated as being a notebook PC having an otherwise conventional clamshell design. However, those of ordinary skill in the art will recognize that the security module of the present invention is readily adaptable to non-clamshell computers, such as PDAs. In each application, the portable computer 100 is provided with a removable security module.

The portable computer 100 comprises a main chassis 110 containing data processing and volatile storage circuitry of the portable computer 100, a nonvolatile storage unit coupled to the data processing and volatile storage circuitry and a source of electrical power. FIG. 1 does not illustrate the circuitry, unit and source, as such are internal to the main chassis.

A security module 120 is slidably coupled to the main chassis 110. The security module contains circuitry for enabling decryption of encrypted data stored in the nonvolatile storage unit and coupling the source of electrical power to the data processing and volatile storage circuitry only when the security module is coupled to the main chassis 110. As with the circuitry, unit and source, the enabling and coupling circuitry is contained within the security module 120 and therefore not illustrated in FIG. 1.

As previously described, the security module 120 is adapted to slide with respect to the main chassis 110. This allows the security module 120 to assume an engaged position (shown) wherein the circuitry within the security module is coupled to, and cooperates with, the circuitry, unit and source within the main chassis 110 to allow the portable computer 100 to function fully (including decryption of encrypted data stored in the nonvolatile storage unit). Those of ordinary skill in the art will realize that other, more conventional data security measures, such as password protection, may be employed in addition to encryption to protect the stored data even when the security module 120 is in the engaged position.

The security module 120 is further able to assume a disengaged position (not shown) wherein the security module 120 is removed from the main chassis 110. When the security module 120 is disengaged, the decryption is disabled and the source of electrical power is decoupled from the data processing and volatile storage circuitry. This impairs both (1) the intrinsic value of the portable computer's hardware by removing critical portions thereof, such as the physical connection between the source of electrical power and the data processing and volatile storage circuitry and (2) access to the data within the computer by severing at least the logical connection between the nonvolatile storage unit and the data processing and volatile storage circuitry.

Those of ordinary skill in the art will understand that there are many ways other than that illustrated in FIG. 1 to effect a suitable coupling between the security module 120 and the main chassis 110. The security module 120 may instead be in the form of an insertable card, analogous to a Personal Computer Memory Card International Association ("PCMCIA") card. However, as will be described, there are certain advantages to allowing the security module 120 to form a portion of an external surface of the main chassis 110, as this allows the security module 110 to contain user-accessible controls (that would be absent were the security module 120 removed from the main chassis 110.

It is highly desirable to make the security module 120 small enough for the owner to carry it conveniently. Therefore, the security module 120 should preferably be less than 10 cubic inches in volume. The security module 120 could have dimensions on the order of a common audio cassette, allowing the security module 120 to be stored in the owner's pocket.

In the illustrated embodiment, the security module 120 further contains a main power switch 122 of the portable computer 100. The main power switch 122 is coupled between the source of electrical power and the data processing and volatile storage circuitry only when the security module 120 is coupled to the main chassis 110. In this embodiment, the security module 120 actually includes the portable computer's main power switch 120. In an alternative preferred embodiment of the present invention, the security module 120 simply contains a conductor for coupling the source of electrical power to the data processing and volatile storage circuitry only when the security module 120 is coupled to the main chassis 110. In this alternative embodiment, the main power switch 122 is located, instead, in the main chassis 110. Removal of the security module 120 from the main chassis 110 interrupts electrical power either entering or exiting the main power switch 122.

In the illustrated embodiment, the security module 120 further contains an AC adapter input connector 124. The AC adapter input connector 124 is coupled to the source of electrical power only when the security module 120 is coupled to the main chassis 110. Thus, the security module 120 preferably further contains the means by which the portable computer 100 is coupled to its associated AC adapter (not shown, but conventional in design and operation). This prevents a thief from circumventing a lack of a connection to the portable computer's internal source of electrical power by plugging in the AC adapter.

In the illustrated embodiment, the security module 120 further contains a data input device 126 of the portable computer 100. The data input device 126 is coupled to the data processing and volatile storage circuitry only when the security module 120 is coupled to the main chassis 110. FIG. 1 illustrates two possible alternatives for the data input device 126: a pointing device 126a and a momentary switch 126b. Those of ordinary skill in the art will realize that the two alternatives are not mutually exclusive. Thus, the security module 120 preferably further contains at least some of the means by which a user may interact with the portable computer. The lack of such data input device 126 (again, brought about when the security module 120 is removed from the main chassis 110) significantly impairs operation of the portable computer 100.

In the illustrated embodiment, the main chassis 110 further contains visual display circuitry, including the computer's visual display 112. The visual display circuitry is coupled to the data processing and volatile storage circuitry only when the security module 120 is coupled to the main chassis 110. Removal of the security module 120 from the main chassis 110 therefore impairs operation of the portable computer's visual display circuitry.

In the illustrated embodiment, the main chassis 110 further contains a keyboard input device 114. The keyboard input device 114 is coupled to the data processing and volatile storage circuitry only when the security module 120 is coupled to the main chassis 110. Removal of the security module 120 from the main chassis 110 therefore also impairs operation of the portable computer's keyboard input device 114.

Figure 2:
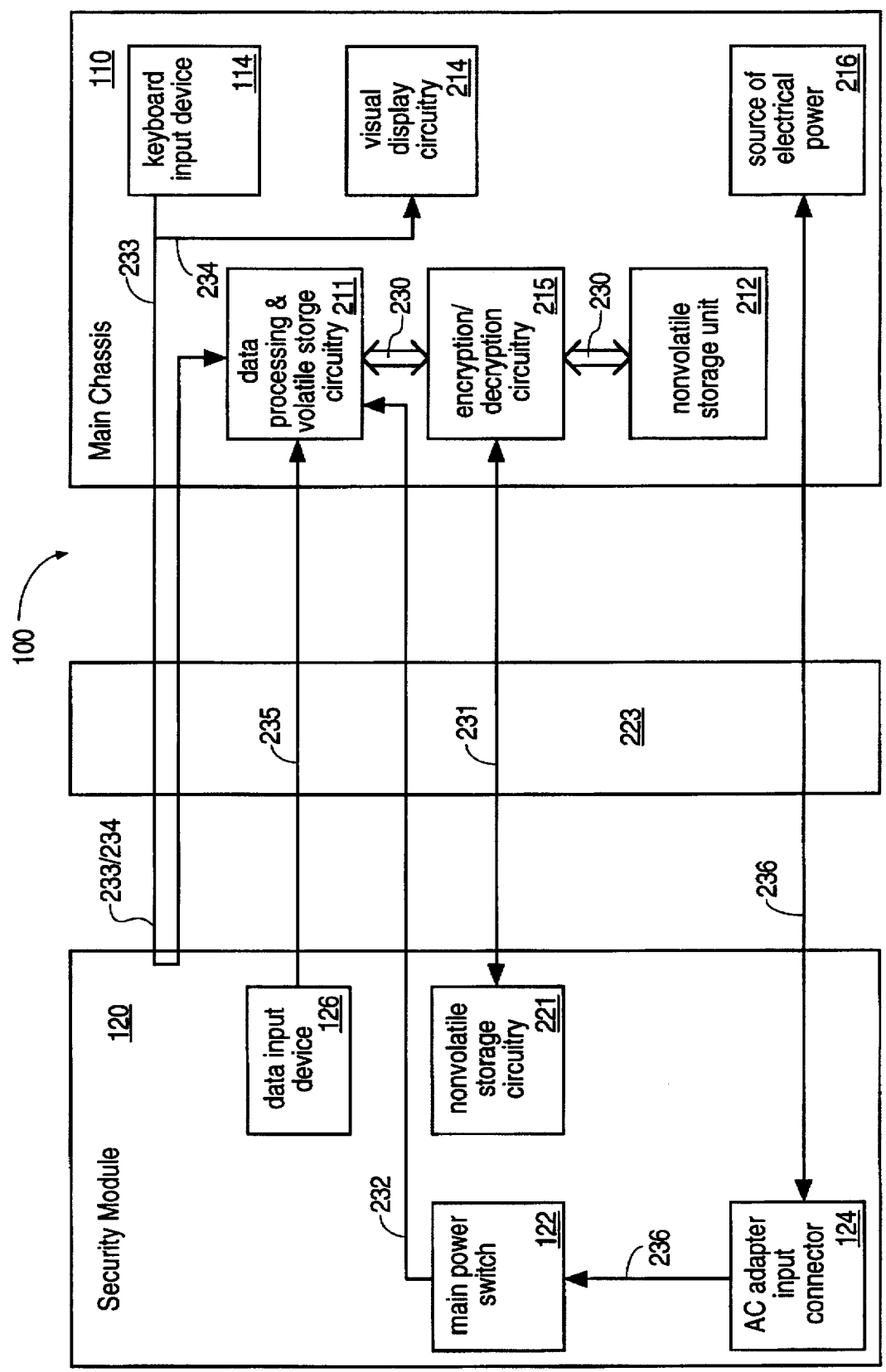
FIG. 2 illustrates a block diagram of the portable computer of FIG. 1.

Turning now to FIG. 2, illustrated is a block diagram of the portable computer of FIG. 1. The main chassis 110 and security module 120 are represented schematically as containing their respective circuitry, units or sources, with interconnecting lines representing conductors or buses electrically coupling the circuitry, units and sources.

As previously described, the main chassis 110 contains data processing and volatile storage circuitry 211 of the portable computer 100, a nonvolatile storage unit 212 coupled to the data processing and volatile storage circuitry 211 and a source of electrical power 216, which may be, for instance, a nickel metal hydride ("NiMH") battery of conventional construction and operation. The main chassis 110 further contains visual display circuitry 214 (including the computer's visual display 112 of FIG. 1) and the keyboard input device 114. Finally, the main chassis 110 further contains encryption/decryption circuitry 215 coupled between the data processing and volatile storage circuitry 211 and the nonvolatile storage unit 212.

Also, as previously described, the security module 120 contains circuitry 221 for enabling decryption of encrypted data stored in the nonvolatile storage unit 212. This circuitry 221 may take the form of nonvolatile storage circuitry having an encryption key stored therein. The security module further contains circuitry for coupling the source of electrical power to the data processing and volatile storage circuitry. The security module 120 is further illustrated as containing the main power switch 122, the AC adapter input connector 124 and the data input device 126 described in conjunction with FIG. 1.

A multi-pin electrical connector 223 separably electrically couples components or subsystems within the security module 120 to components or subsystems within the main chassis 110.

As shown, a relatively high speed bus 230 couples the nonvolatile storage unit 212 to the data processing and volatile storage circuitry 211 via the encryption/decryption circuitry 215. A relatively low speed bus 231 couples the nonvolatile storage circuitry in the security module 120 to the encryption/decryption circuitry 215. As long as the security module 120 is joined to the main chassis 110 and the low speed bus 231 is therefore intact, the encryption/decryption circuitry 215 has access to the encryption key, thereby enabling decryption of the data stored in the nonvolatile storage unit 212. Without the encryption key, and depending upon the strength of the encryption algorithm employed, security with respect to the data stored in the nonvolatile storage unit 212 is significantly enhanced.

As previously mentioned, the security module 120 can be made to contain the encryption/decryption circuitry 215. However, in such alternative, the high speed bus 230 would be required to traverse the electrical connector 223 between the security module 120 and the main chassis 110.

As also shown, conductor 232 couples the source of electrical power 216 to the data processing and volatile storage circuitry 211 via the main power switch 122. A loopback circuit 233 couples the keyboard input device 114 to the data processing and volatile storage circuitry 211. A loopback circuit 234 couples the data processing and volatile storage circuitry 211 to the visual display circuitry 214. A bus 235 couples the data input device 126 to the data processing and volatile storage circuitry 211. Finally, conductors 236 couple the AC adapter input connector 124 to conductor 232, to the source of electrical power 216 and to the data processing and volatile storage circuitry 211. When the electrical connector 223 is separated, the conductors 236, circuits 233, 234 and bus 235 are severed, rendering the portable computer 100 unusable and the encrypted data stored in the nonvolatile storage unit 212 inaccessible.

From the above description, it is apparent that the present invention provides a portable computer and a method of securing the same. The portable computer comprises: (1) a main chassis containing (a) data processing and volatile storage circuitry of the portable computer, (b) a nonvolatile storage unit coupled to the data processing and volatile storage circuitry and (c) a source of electrical power and (2) a security module removably coupled to the main chassis and containing circuitry for (a) enabling decryption of encrypted data stored in the nonvolatile storage unit and (b) coupling the source of electrical power to the data processing and volatile storage circuitry only when the security module is coupled to the main chassis, the decryption disabled and the source of electrical power decoupled from the data processing and volatile storage circuitry when the security module is removed from the main chassis.

Although the present invention and its advantages have been described in detail, those skilled in the art should understand that they can make various changes, substitutions and alterations herein without departing from the spirit and scope of the invention in its broadest form.

What is claimed is:

1. A portable computer, comprising:
    a main chassis containing (a) data processing and volatile storage circuitry of said portable computer, (b) a nonvolatile storage unit coupled to said data processing and volatile storage circuitry and (c) a source of electrical power; and
    a security module removably coupled to said main chassis and containing circuitry for (a) enabling decryption of encrypted data stored in said nonvolatile storage unit and (b) coupling said source of electrical power to said data processing and volatile storage circuitry only when said security module is coupled to said main chassis, said decryption disabled and said source of electrical power decoupled from said data processing and volatile storage circuitry when said security module is removed from said main chassis.

2. The computer as recited in claim 1 wherein said main chassis further contains encryption/decryption circuitry coupled between said data processing and volatile storage circuitry and said nonvolatile storage unit and said security module further contains nonvolatile storage circuitry having an encryption key stored therein, said nonvolatile storage circuitry coupled to said encryption/decryption circuitry only when said security module is coupled to said main chassis to allow said encryption/decryption circuitry to retrieve said encryption key from said nonvolatile storage circuitry.

3. The computer as recited in claim 1 wherein said security module further contains a main power switch of said portable computer, said main power switch coupled between said source of electrical power and said data processing and volatile storage circuitry only when said security module is coupled to said main chassis.

4. The computer as recited in claim 1 wherein said security module further contains a conductor for coupling said source of electrical power to said data processing and volatile storage circuitry only when said security module is coupled to said main chassis.

5. The computer as recited in claim 1 wherein said security module further contains an AC adapter input connector, said AC adapter input connector coupled to said source of electrical power only when said security module is coupled to said main chassis.

6. The computer as recited in claim 1 wherein said security module further contains a data input device of said portable computer, said data input device coupled to said data processing and volatile storage circuitry only when said security module is coupled to said main chassis and selected from the group consisting of:
    a pointing device, and
    a momentary switch.

7. The computer as recited in claim 1 wherein said main chassis further contains visual display circuitry, said visual display circuitry coupled to said data processing and volatile storage circuitry only when said security module is coupled to said main chassis.

8. The computer as recited in claim 1 wherein said main chassis further contains a keyboard input device, said keyboard input device coupled to said data processing and volatile storage circuitry only when said security module is coupled to said main chassis.

9. The computer as recited in claim 1 wherein said security module is less than 10 cubic inches in volume.

10. The computer as recited in claim 1 wherein said computer is a portable personal computer (PC) selected from the group consisting of:

a notebook PC, a subnotebook PC, and a personal digital assistant (PDA).

11. A method of securing a portable computer, comprising the steps of:

joining a security module to a main chassis containing (a) data processing and volatile storage circuitry of said portable computer, (b) a nonvolatile storage unit coupled to said data processing and volatile storage circuitry and (c) a source of electrical power, said security module containing circuitry for (a) enabling decryption of encrypted data stored in said nonvolatile storage unit and (b) coupling said source of electrical power to said data processing and volatile storage circuitry; and removing said security module from said main chassis, said decryption disabled and said source of electrical power decoupled from said data processing and volatile storage circuitry.

12. The method as recited in claim 11 wherein said main chassis further comprises encryption/decryption circuitry coupled between said data processing and volatile storage circuitry and said nonvolatile storage unit and said security module further contains nonvolatile storage circuitry having an encryption key stored therein, said method further comprising the step of coupling said nonvolatile storage circuitry to said encryption/decryption circuitry only when said security module is coupled to said main chassis to allow said encryption/decryption circuitry to retrieve said encryption key from said nonvolatile storage circuitry.

13. The method as recited in claim 11 wherein said security module further contains a main power switch of said portable computer, said method further comprising the step of coupling said main power switch between said source of electrical power and said data processing and volatile storage circuitry only when said security module is coupled to said main chassis.

14. The method as recited in claim 11 further comprising the step of coupling said source of electrical power to said data processing and volatile storage circuitry with a conductor within said security module only when said security module is coupled to said main chassis.

15. The method as recited in claim 11 wherein said security module further contains an AC adapter input connector, said method further comprising the step of coupling said AC adapter input connector to said source of electrical power only when said security module is coupled to said main chassis.

16. The method as recited in claim 11 wherein said security module further contains a data input device of said portable computer, said method further comprising the step of coupling said data input device to said data processing and volatile storage circuitry only when said security module is coupled to said main chassis and selected from the group consisting of:

a pointing device, and a momentary switch.

17. The method as recited in claim 11 wherein said main chassis further contains visual display circuitry, said method further comprising the step of coupling said visual display circuitry to said data processing and volatile storage circuitry only when said security module is coupled to said main chassis.

18. The method as recited in claim 11 wherein said main chassis further contains a keyboard input device, said method further comprising the step of coupling said keyboard input device to said data processing and volatile storage circuitry only when said security module is coupled to said main chassis.

19. The method as recited in claim 11 wherein said security module is less than 10 cubic inches in volume.

20. The method as recited in claim 11 wherein said computer is a portable personal computer (PC) selected from the group consisting of:

a notebook PC, a subnotebook PC, and a personal digital assistant (PDA).

* * * * *